E. E. EUCHENHOFER.
CUSHION TIRE FOR VEHICLES.
APPLICATION FILED NOV. 19, 1908.
941,508.
Patented Nov. 30, 1909.
2 SHEETS—SHEET 1.
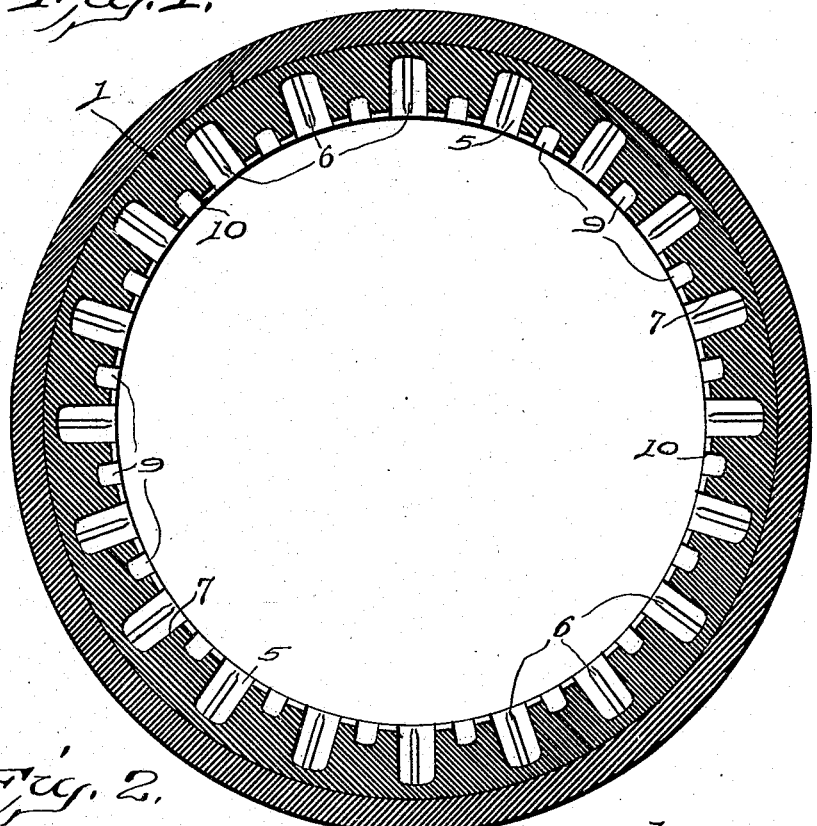
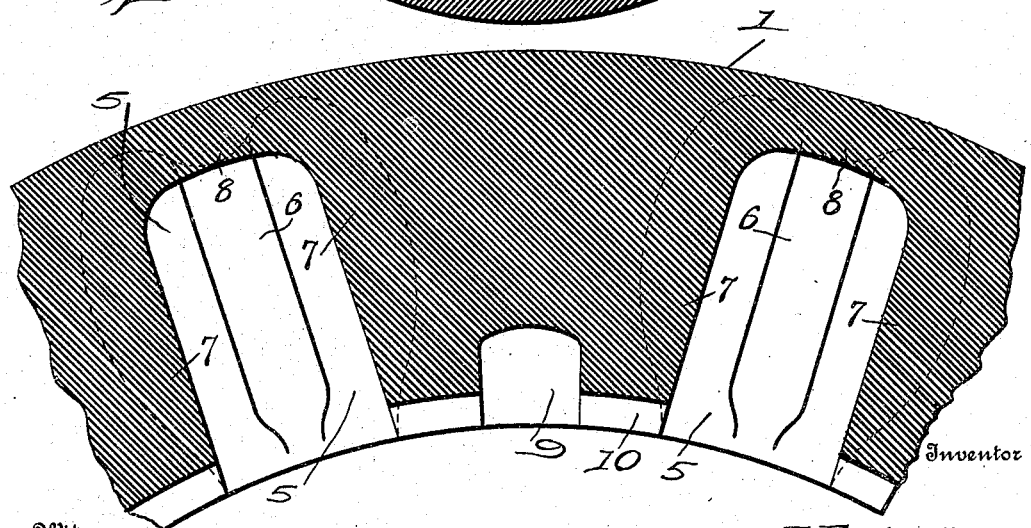
Witnesses
G. Howard Walmsley
Edward Reed
Inventor
Edward E. Euchenhofer,
By H. A. Toulmin,
Attorney

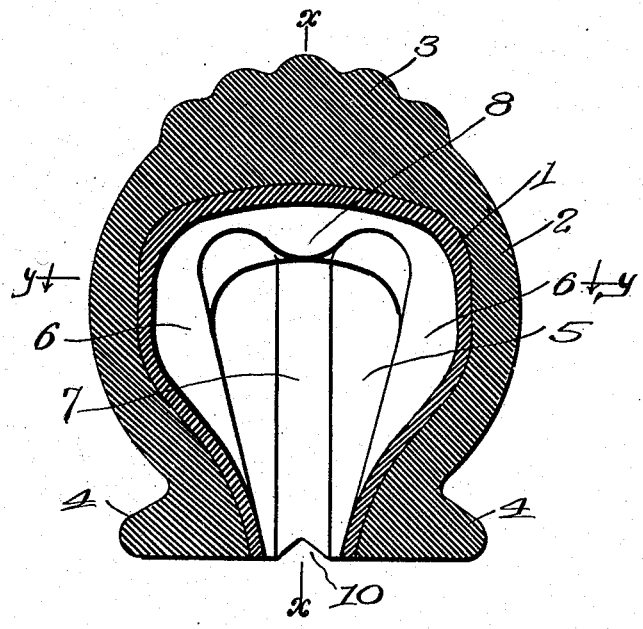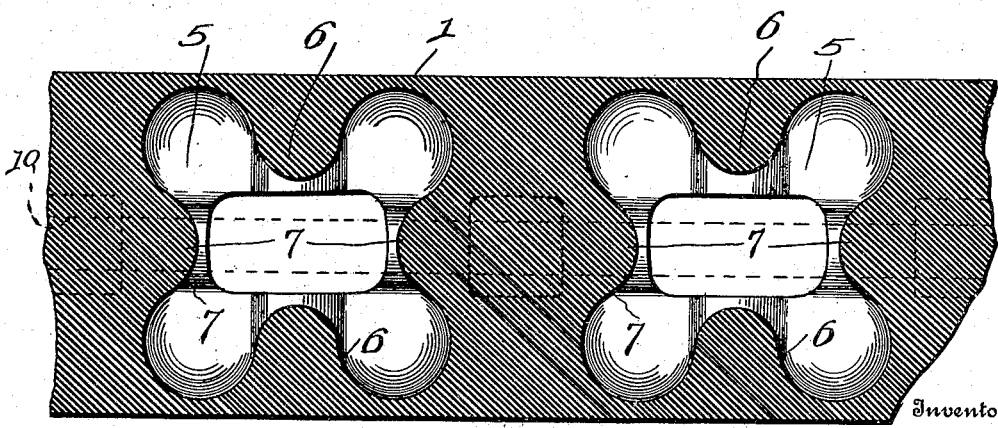

UNITED STATES PATENT OFFICE.

EDWARD E. EUCHENHOFER, OF DAYTON, OHIO.

CUSHION-TIRE FOR VEHICLES.

941,508.

Specification of Letters Patent.

Patented Nov. 30, 1909.

Application filed November 19, 1908. Serial No. 463,446.

*To all whom it may concern:*

Be it known that I, EDWARD E. EUCHENHOFER, a citizen of the United States, residing at Dayton, in the county of Montgomery and State of Ohio, have invented certain new and useful Improvements in Cushion-Tires for Vehicles, of which the following is a specification, reference being had therein to the accompanying drawings.

This invention relates to cushion tires for vehicles, and the object of the invention is to provide a tire, having a high degree of resiliency, which derives its resiliency from a source other than compressed air, thus eliminating the objections to which a pneumatic tire is subject.

To this end, it is a further object of the invention to provide a tire having a series of cavities arranged about the circumference thereof and to provide one or more of the walls of each of these cavities with means for reinforcing the same, thereby offering a yielding resistance to the tendency of the tread to move toward the rim when that portion of the tire containing the cavity is subjected to pressure or weight.

It is also an object of the invention to so construct each cavity that the inner wall thereof or the wall lying nearest the tread of the tire will form a bridge over the cavity and to provide an arch within the cavity for reinforcing this bridge.

A further object of the invention is to so connect the several cavities one to the other that there will be a communication between them which will tend to increase the resiliency of the tire as a whole; and to provide means to facilitate the insertion of the tire in the channeled rim of the wheel and to more firmly secure the same within said channeled rim when it has once been placed in position.

With these objects in view my invention consists in certain novel features and certain combinations and arrangements of parts hereinafter to be described, and then more particularly pointed out in the claims.

In the accompanying drawings, Figure 1 is a vertical, sectional view, taken transversely to the axis of rotation of a tire embodying my invention; Fig. 2 is a longitudinal, sectional view of a portion of the core of the tire, taken on the line *x x* of Fig. 3; Fig. 3 is a transverse, sectional view of the tire; and Fig. 4 is a longitudinal, sectional view, taken on the line *y y* of Fig. 3.

In these drawings I have illustrated one embodiment of my invention, and, in the form here shown, the tire comprises an inner portion or core 1 having an outer protecting covering 2 which is provided on its outer side with a tread surface 3 and is provided on its inner side with oppositely extending annular shoulders 4 adapted to engage the channeled rim of the wheel. The core 1 is entirely inclosed within the casing 2 with the exception of its inner side, that is, the side lying nearest to the rim, which side is flush with the adjacent edges of the side portions of the protecting covering 2.

The inner side of the tire is provided with a series of cavities or chambers 5 arranged circumferentially thereto and preferably extending radially of the tire as a whole. These cavities are, in the present instance, formed entirely within the core 1 and are of such a depth that that portion of the core forming the inner wall of the cavity, or the wall lying next to the tread, forms a bridge extending over the adjacent end of the cavity. Each cavity is provided with means for reinforcing one or more of its walls to resist the tendency of the outer portion of the tire to be moved toward the rim under pressure, thus strengthening the inner wall or bridge of the cavity. This reinforcing means preferably comprises one or more ribs extending from the wall or walls which are to be reinforced. In the present instance, I have shown the cavity as provided with inwardly extending ribs 6 on the opposite side walls thereof, that is, the walls adjacent to the sides of the tire, and I have also shown the end walls, or the walls arranged in longitudinal alinement with the tire, provided with similar ribs 7.

The ribs 6 on the side walls of the cavity begin at a point near the outer end or mouth of the cavity, at which point the ribs are very thin, and gradually increase in thickness until, at a point near the center of the depth of the cavity, they attain their greatest thickness. These ribs extend beyond the side walls of the cavity and onto the inner wall thereof and come together at approximately the center of said inner wall, at which point they are united to form practically a continuous rib extending about the wall of the cavity and forming an arch which extends transversely to the tire and serves to reinforce the inner wall or bridge of the cavity. The ribs 7 on the end walls of the cavity are of a construction and arrangement similar to the ribs 6, save that they are arranged longitudinally of the inner wall of the tire and they intersect the ribs 6 near their point of union on said tire, as shown at 8. The cavities are, in the present instance, shown as having their greatest diameter, taken both transversely and longitudinally of the tire, at a point removed from the inner side of the tire and the mouth of the cavity. Both the side and end walls of the cavity converge toward the inner side of the tire, and, consequently, the mouth or opening of the cavity is of considerably less diameter than the greatest diameter of the cavity.

The number and size of the cavities are regulated to correspond to the size of the tire and the weight of the vehicle to which it is to be attached. Where the tire is to be used with a vehicle of considerable weight the cavities are spaced some distance apart, and, in order to increase the resiliency of the solid portion of the tire lying between the adjacent cavities I prefer to provide the same with a recess 9 of comparatively small size. To still further increase the resiliency of this portion of the tire and of the tire as a whole, I prefer to connect the several cavities one to the other so that they will intercommunicate in such a manner as to so increase the resiliency of the tire. This intercommunication is, in the present instance, accomplished by providing the tire with a circumferential groove 10 which is preferably substantially V-shaped and extends about the inner side of the tire, intersecting the mouths of the cavities. This groove not only permits the tire to yield under pressure to a certain extent, but also permits the annular shoulders 4 to be compressed one toward the other to facilitate the insertion of the same into the channeled rim. After the shoulders have been so inserted, pressure on the tread of the tire will tend to expand the groove and will thus force the annular shoulders more firmly into engagement with the channeled rim, thereby retaining the tire firmly in position.

With a tire of this construction the walls of the cavities are so reinforced that, when that portion of the tire containing a particular cavity is in contact with the ground and is sustaining the weight of the load, the reinforcing ribs will offer a yielding resistance to the tendency on the part of the tread to move toward the rim of the wheel, thereby imparting to the tire a high degree of resiliency. The resistance of the ribs is such that the tire will respond instantly when the pressure is relieved and will immediately assume its normal position, forming what is known as a live tire. Further, the annular groove and the recesses in the solid portion of the tire afford a certain degree of resiliency to that portion of the tire which lies between the several cavities and permits that portion of the tire to be compressed under pressure to a certain extent. The effect of the shape of the recesses on this solid portion of the tire is such as to permit that portion of the tire to be compressed, and, in this manner, a substantially uniform resiliency is imparted to the tire throughout its circumference and the solid portions of the tire do not tend to form a series of projections or "bumps" lying between the cavities. The effect of the construction of the cavities upon the solid portion of the tire is further accentuated by the annular groove and recesses, as above described. Thus, it will be apparent that I have provided a cushion tire having a high degree of resiliency and have eliminated from that tire the usual objections to which a pneumatic tire is open, such as the liability to puncture and collapse, it being apparent that, by the construction and arrangement of the cavities with their bridging walls and ribbed walls, I have so reinforced the walls of the cavities that they offer a yielding resistance to the tendency of the tread of the tire to move toward the rim of the wheel when under pressure, and thus effectually prevent the walls of the cavities from collapsing. Further, it will be apparent that I have so constructed the intervening solid portions of the tire that they also have a certain degree of resiliency and coöperate with the cavities to form a tire having a substantially uniform resiliency throughout its circumference; and also, that, by providing the longitudinal groove about the inner circumference of the tire, I greatly facilitate the insertion of the annular retaining shoulders in the channeled rim of the wheel, and, when the shoulders have been placed in position, they are firmly held therein.

While I have shown and described one particular form of construction of tire and a particular arrangement of the cavities therein, it will be obvious that both the shape and arrangement of the cavities, as well as the construction of the tire, may be widely varied without departing from the principle of my invention. I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. A tire having a circumferentially arranged series of independent cavities, and means contained within each of said cavities and formed integral with the walls thereof for reinforcing said walls.

2. A tire having a circumferentially arranged series of independent cavities, and ribs extending inwardly from the side walls of each of said cavities.

3. A tire having a circumferentially arranged series of cavities, and ribs extending from the opposite side walls and from the inner wall of each of said cavities and having their adjacent ends joined, thereby forming a practically continuous rib.

4. A tire having a circumferentially arranged series of cavities, and ribs extending from the four side walls of each of said cavities.

5. A tire having a series of independent radially arranged cavities in the inner circumferential wall thereof, and radially arranged reinforcing ribs extending from the walls of said cavities.

6. A tire having a series of independent cavities in the inner wall thereof, the side walls of each of said cavities converging toward the inner side of said tire, and ribs extending from said converging walls.

7. A tire having a series of cavities in the inner wall thereof, the side walls of each of said cavities converging toward the inner side of said tire, and ribs extending from said converging walls, and tapering toward the inner side of said tire.

8. A tire having a series of cavities on the inner side thereof, the inner wall of each of said cavities forming a bridge, and an arch in each of said cavities arranged transversely to said tire and adapted to reinforce said bridge.

9. A tire having a series of cavities formed in the inner circumferential wall thereof and spaced some distance apart, those portions of said circumferential wall lying between said cavities having recesses therein, and means for reinforcing the walls of said cavities.

10. A tire having a series of radial cavities formed therein and extending through the inner circumferential wall thereof, and having a groove formed in and extending about said circumferential wall and intersecting said cavities, and ribs extending inwardly from the walls of each of said cavities.

In testimony whereof, I affix my signature in presence of two witnesses.

EDWARD E. EUCHENHOFER.

Witnesses:
JOHN ROEHM,
HARRY B. SOLIMANE.